Aug. 21, 1934.   M. MENNESSON   1,971,271
PNEUMATIC MEASURING DEVICE
Filed July 9, 1931   2 Sheets-Sheet 2

Inventor:
    Marcel Mennesson.
Attorney:

Patented Aug. 21, 1934

1,971,271

UNITED STATES PATENT OFFICE 1,971,271

PNEUMATIC MEASURING DEVICE

Marcel Mennesson, Neuilly-sur-Seine, France, assignor to Societe Anonyme de Construction de Material Automobile S. A. C. M. A., Paris, France, a society of France Application July 9, 1931, Serial No. 549,770
In Belgium September 9, 1930

5 Claims. (Cl. 33—174)

The present invention relates to pneumatic measuring devices of the type described in the present inventor's copending applications, Serial No. 334,987, filed Jan. 25th 1929 and Serial No. 442,915, filed April 9th 1930.

One of the objects of the invention is to provide an apparatus for measuring the thickness of metal plates, films, cardboard, rubber and similar objects either while at rest or in movement and without touching the object being measured.

Another object is to provide means for accurately measuring the length, width or thickness of an object one of whose surfaces is not rigorously plane.

Further objects will appear in the course of the detailed description now to be given with reference to the accompanying drawings, in which.

Figure 1:
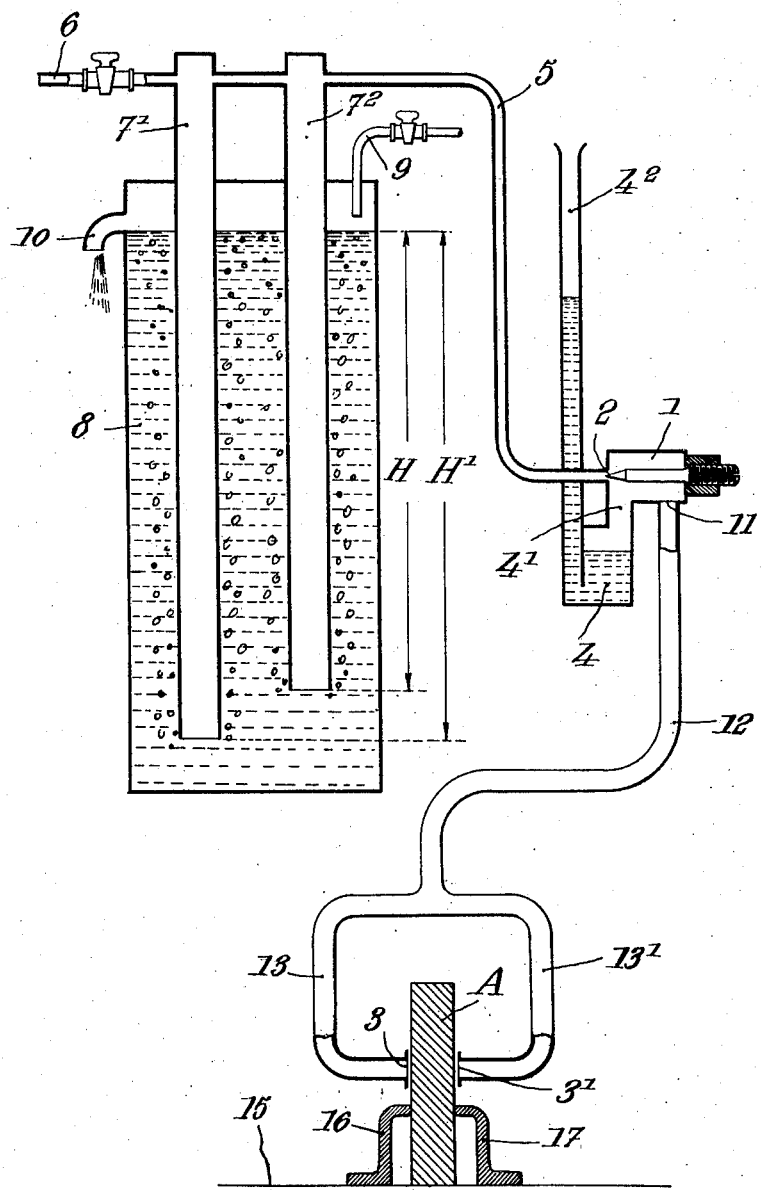
Fig. 1 is a diagrammatic section showing one illustrative embodiment of the invention.

Referring to Fig. 1 of the drawings, there is shown an assembly composed of the following elements: a chamber 1 provided with a needle valve controlling an air inlet port 2; a manometric tube $4^2$ containing a liquid 4 and responding to variations of pressure in chamber 1 via a conduit $4^1$; an air supply tube 5 connected to a source of air pressure at 6; a pair of tubes $7^1$ and $7^2$ intercalated between conduits 5 and 6 and extending into a liquid 8 to two different depths H and $H^1$; a water supply conduit 9 and overflow 10; a conduit 12 communicating at one extremity via a port 11 with chamber 1 and at its opposite extremity with a bifurcated double-U shaped member 13, $13^1$; a support or table 15; a pair of guiding elements 16 and 17 mounted on said support; and an object A inserted between elements 16 and 17 and designed to be measured.

The hereinabove described assembly operates in the following manner: assuming water to be supplied via conduit 9 and discharged through overflow 10, air entering through conduit 6 will be fed at substantially constant pressure through port 2 into chamber 1, momentary excesses of pressure being taken care of by conduits $7^1$ and $7^2$ in a manner already described in the inventor's copending application Serial No. 334,987, filed Jan. 25th 1929. Air is delivered from chamber 1 via port 11 to conduits 12, 13 and $13^1$ and finds its way out through a pair of discharge orifices 3 and $3^1$ into contact with object A to be measured; it will readily be seen that any variation in the thickness of object A will diminish or increase the annular space between the latter and orifices 3, $3^1$, thus causing the pressure inside chamber 1 to vary so as to modify the equilibrium of liquid 4 in branches $4^1$ and $4^2$ of the manometer.

From the foregoing, it will at once be obvious that a simple reading of the manometer is all that is necessary for measuring the thickness (length or width) of object A. If the thickness of object A were to be measured by placing the latter on a support and measuring the height of one of its surfaces above said support, it is obvious that, if the surface in contact with the support presented any irregularities whatsoever, the true thickness at any given point would not be obtained. On the contrary, when the form of apparatus show in Fig. 1 is made use of, object A rests on a lateral edge and the two surfaces limiting its thickness may be explored from point to point. It is preferable that discharge orifices 3, $3^1$ be mounted in parallel relation and that object A be guided so as not to contact with either of the latter. This is accomplished by guiding elements 16 and 17. It is not necessary to guide object A equidistantly from orifices 3 and $3^1$, the variations in pressure at each of the latter points being additive as transmitted via conduit 12 to chamber 1.

Figure 2:
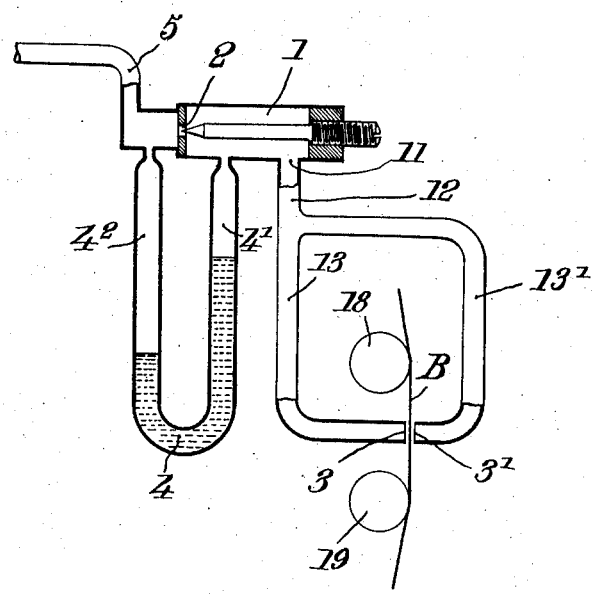
Fig. 2 represents, in diagrammatic section, a form of device adapted to be used on film or similar objects while in movement.

In the form of apparatus shown in Fig. 2, the general assembly remains the same except that branches $4^1$ and $4^2$ of the manometer, instead of communicating with chamber 1 and the atmosphere respectively, communicate with the former and with conduit 5, thus measuring variations in pressure inside chamber 1 relatively to the constant pressure in conduit 5. The object to be measured B, which may, for example, be a photographic film or the like in movement between orifices 3 and $3^1$, is guided between the latter and in spaced relation thereto by rotatable guiding elements 18 and 19. The mode of operation is substantially the same as for the apparatus shown in Fig. 1. Variations in the thickness of the film will change the total discharge section adjacent orifices 3 and $3^1$ and modify the reading in manometric branches $4^1$ and $4^2$ in a manner which will at once be evident. It will be noted that the manometric readings are instantaneous and continuous during movement of the film and that no measuring object or instrument is in contact with the latter while its thickness is being measured.

What I claim is:—

1. An apparatus of the class described comprising in combination means for producing a flow of fluid under substantially constant pressure, a bifurcated conduit communicating with said means, said bifurcated conduit having a pair of opposed free extremities communicating with the atmosphere, and means for measuring variations of pressure produced in said bifurcated conduit when an object is interposed between the free extremities thereof.

2. An apparatus of the class described comprising in combination, a source of fluid under substantially constant pressure, a chamber communicating with said source, a manometer connected to said chamber, and a bifurcated conduit connected to said chamber, said bifurcated conduit having a pair of free extremities facing one another and communicating with the atmosphere, whereby variations in pressure will be produced in said bifurcated conduit when an object is placed between the free extremities thereof and will be communicated via said chamber to said manometer.

3. In combination, a source of fluid under substantially constant pressure, a chamber communicating with said source, conduit means communicating with said chamber and including a pair of discharge orifices positioned to receive an object therebetween, and means for measuring variations of pressure in said chamber when an object is interposed between said discharge orifices.

4. In combination, a bifurcated conduit adapted to receive a fluid under pressure, said bifurcated conduit having a pair of free extremities positioned in substantially parallel relation to one another and communicating with the atmosphere, and means for measuring the combined variations in the pressures inside the branches of said bifurcated conduit when an object is interposed between the free extremities thereof.

5. A structure as defined in claim 3 in combination with means for guiding an object in spaced relation to said discharge orifices.

MARCEL MENNESSON.